United States Patent Office 2,981,172
Patented Apr. 25, 1961

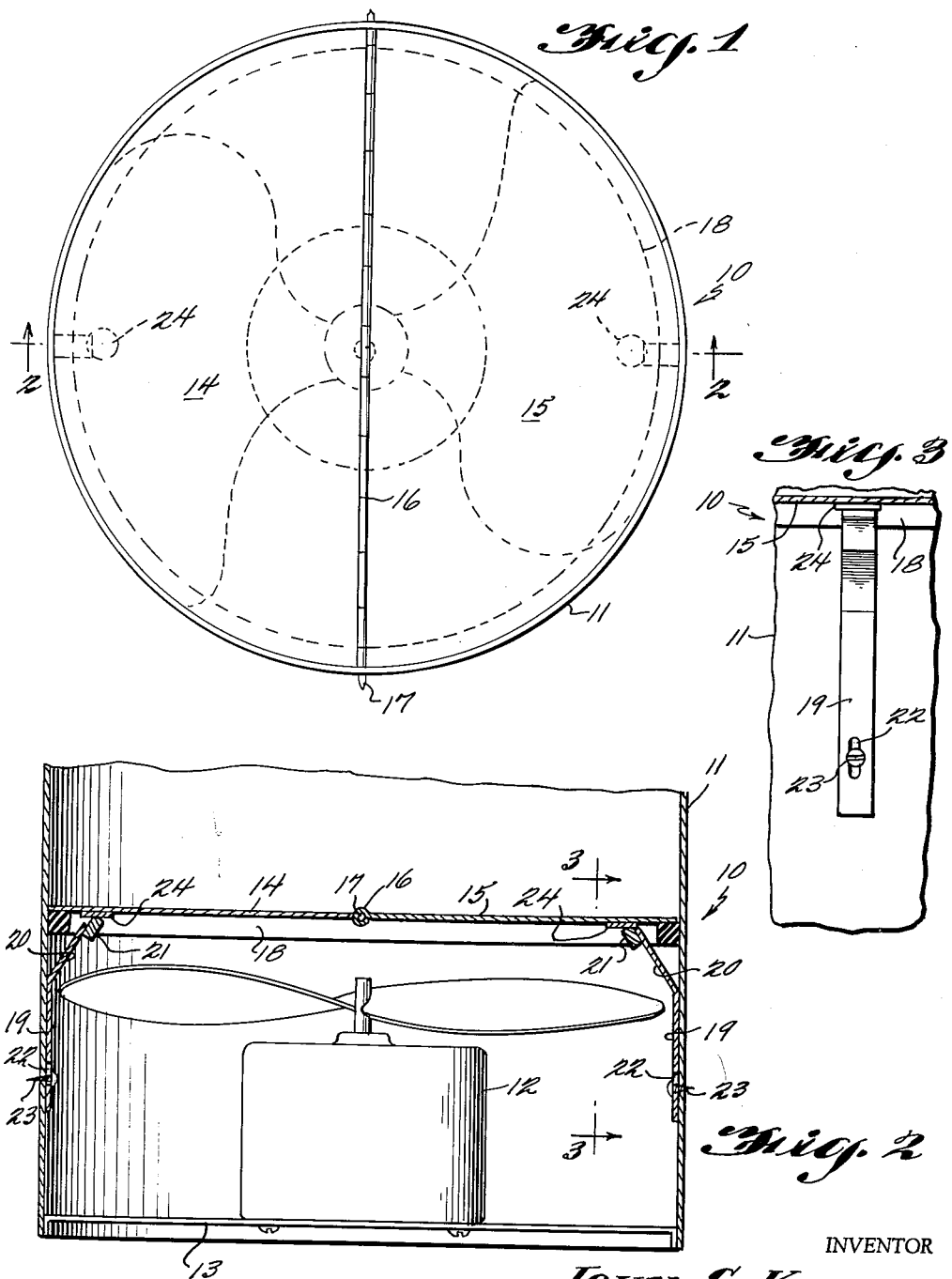

2,981,172
UPDRAFT VENTILATOR AND MAGNETIC DAMPER CATCH THEREFOR

John S. Kalman, 3375 E. Lunham Ave., Cudahy, Wis.

Filed Jan. 22, 1959, Ser. No. 788,297

1 Claim. (Cl. 98—116)

The present invention relates to a magnetic damper catch and particularly to a catch for dampers which are automatically opened.

The primary object of the invention is to provide a magnetic damper catch for holding a damper in closed position when out of operation.

Another object of the invention is to provide a magnetic damper catch of the class described above which will automatically release the damper when a pre-determined air pressure is exerted on the damper.

A further object of the invention is to provide a magnetic damper catch of the class described above in which vibration of the damper when the fan is in off position will be eliminated.

A still further object of the invention is to provide a magnetic damper latch of the class described above which is inexpensive to manufacture, simple to operate and which will effectively secure the damper blades in closed position.

Other objects and advantages will become apparent in the following specification when considered in light of the attached drawings, in which:

Figure 1 is a top plan view of the invention;

Figure 2 is a fragmentary vertical sectional view taken along the line 2—2 of Figure 1, looking in the direction of the arrows; and Figure 3 is an enlarged fragmentary vertical sectional view taken along the line 3—3 of Figure 2, looking in the direction of the arrows.

Referring now to the drawings in detail wherein like reference characters indicate like parts throughout the several figures, the reference numeral 10 indicates generally a magnetic damper catch constructed in accordance with the invention.

The magnetic damper catch 10 is used with an exhaust conduit 11 of generally cylindrical form having a conventional exhaust fan 12 mounted therein on a bracket 13.

A pair of semi-circular damper blades 14, 15 are hingedly connected at 16 by a hinged pin 17 which extends horizontally through the conduit 11 mounting the damper blades 14, 15 therein.

A rubber rest ring 18 is arranged horizontally in the conduit 11 and engages beneath the circular edges of the damper blades 14, 15, as is clearly shown in Figure 2. The fan 12 when in operation applies air pressure to the undersides of the damper blades 14, 15, causing them to hinge upwardly and inwardly, permitting the flow of air through the conduit 11. Upon the deenergization of the fan 12, gravity returns the damper blades 14, 15 to the position illustrated in Figure 2 engaging the rubber rest ring 18 to prevent the flow of cold air into the building serviced by the exhaust fan 12.

A bracket 19 is secured in upright relation to the conduit 11 underlying the midpoint of each of the damper blades 14, 15 and has an upwardly and inwardly offset support portion 20 integrally formed on the supper end thereof. A magnet 21 is secured to the upper end of the support portion 20 of the bracket 19, adjacent the underside of the damper blades 14, 15.

The brackets 19 are each provided with an upright slot 22 formed therein through which an attaching screw 23 extends to secure the bracket 19 to the conduit 11. The slot 2 permits the magnets 21 to be adjusted vertically for their best operation.

A metallic disk of magnetically attractable material is illustrated at 24 and is secured to the underside of the damper blades 14, 15 in position to be contacted by the magnets 21. The metallic disks 24 may be secured to the damper blades 14, 15 by mastic or other suitable securing material.

In the use and operation of the invention, the magnetic attraction of the magnets 21 for the disks 24 is such that minor changes in air pressure, as well as minor currents of air in the conduit 11, will not be effective to vibrate or open the damper blades 14, 15 until air pressure exerted by the fan 12 is brought to bear on the underside of the damper blades 14, 15. The air pressure from the fan 12 is sufficient to overcome the attraction of the magnet 21 for the disks 24 and the damper blades 14, 15 will open almost immediately to permit the normal flow of exhaust air through the conduit 11.

With the present invention, back flow and vibration, as well as fluttering of the damper blades 14, 15, are completely eliminated and the damper blades 14, 15 remain sealed except when the fan 12 is operating.

Having thus described the preferred embodiments of the invention, it should be understood that numerous structural modifications and adaptations may be resorted to without departing from the scope of the appended claim.

What is claimed is:

In combination with an exhaust system of the type including a vertically positioned conduit, an exhaust fan horizontally mounted in said conduit, a pair of gravity actuated damper blades hingedly secured together in said conduit above said exhaust fan, a rubber rest ring secured in said conduit for supporting the semi-circular edges of said damper blades, a damper catch for said blades comprising a pair of oppositely disposed elongated brackets secured to the inner wall of said conduit below said rubber rest ring in oppositely disposed relation, one adjacent the free semi-circular edge of each damper blade, each bracket having an angularly offset free end portion extending upwardly and inwardly toward the center of the conduit, a magnet secured to the offset end portion of each bracket, a metallic member on each damper blade cooperating with its adjacent magnet for maintaining that damper blade in closed position, each bracket having an elongated slot therein and a screw extending through said slot and fixed in the wall of said conduit for varying the position of the associated bracket and magnet relative to the adjacent metallic member.

References Cited in the file of this patent

UNITED STATES PATENTS

| | | |
|---|---|---|
| 2,297,790 | Miller | Oct. 6, 1942 |
| 2,319,109 | Bulloch | May 11, 1943 |
| 2,641,987 | Burgan | June 16, 1953 |
| 2,739,531 | Spear | Mar. 27, 1956 |